United States Patent
Tanaka et al.

(10) Patent No.: US 6,795,305 B2
(45) Date of Patent: Sep. 21, 2004

(54) BATTERY PACK FOR AN INFORMATION PROCESSING APPARATUS AND THE INFORMATION PROCESSING APPARATUS

(75) Inventors: Kaigo Tanaka, Kawasaki (JP); Sonomasa Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 79 days.

(21) Appl. No.: 10/087,790

(22) Filed: Mar. 5, 2002

(65) Prior Publication Data

US 2003/0053290 A1 Mar. 20, 2003

(30) Foreign Application Priority Data

Sep. 18, 2001 (JP) ........................................ 2001-283800

(51) Int. Cl.[7] .............................................. G06F 1/16
(52) U.S. Cl. ........................ 361/683; 429/99; 320/107; 320/113; D13/103
(58) Field of Search .................. 361/679–686; 429/96–123; 320/107–113; D13/103–106

(56) References Cited

U.S. PATENT DOCUMENTS

| | | | | |
|---|---|---|---|---|
| 4,510,215 A | * | 4/1985 | Adam ........................... | 429/99 |
| 5,060,990 A | * | 10/1991 | Smith et al. ................. | 361/683 |
| 5,506,749 A | * | 4/1996 | Matsuda ....................... | 361/683 |
| 5,677,827 A | * | 10/1997 | Yoshioka et al. ............ | 361/683 |
| 5,724,224 A | * | 3/1998 | Howell et al. ............... | 361/680 |
| 5,901,035 A | * | 5/1999 | Foster et al. ................. | 361/683 |
| D415,466 S | * | 10/1999 | Kawa .......................... | D13/103 |
| 6,002,583 A | * | 12/1999 | Shoji et al. .................. | 361/683 |
| D421,244 S | * | 2/2000 | Goto ........................... | D13/103 |
| 6,078,496 A | * | 6/2000 | Oguchi et al. ............... | 361/683 |
| D448,003 S | * | 9/2001 | Ogasawara ................. | D13/103 |
| D476,949 S | * | 7/2003 | Wada .......................... | D13/103 |
| 2002/0006750 A1 | * | 1/2002 | Hidesawa .................... | 439/625 |
| 2003/0053289 A1 | * | 3/2003 | Tanaka et al. .............. | 361/683 |

FOREIGN PATENT DOCUMENTS

| | | |
|---|---|---|
| CN | 2377614 Y | 5/2000 |
| JP | 5-143192 | 6/1993 |

OTHER PUBLICATIONS

Chinese Office Action dated Feb. 11, 2004 with translation.

* cited by examiner

*Primary Examiner*—Lisa Lea-Edmonds
(74) *Attorney, Agent, or Firm*—Armstrong, Kratz, Quintos, Hanson & Brooks, LLP

(57) ABSTRACT

A battery pack detachably connected to an information processing apparatus, wherein the information processing apparatus includes a body part and a display part supported by the body part and thereby the display part can be opened and closed against the body part, includes a housing part having a hollow part in which a battery can be housed, wherein the hollow part is situated at a position which faces an end part of the display part when the display part is closed.

12 Claims, 6 Drawing Sheets

BATTERY PACK FOR AN INFORMATION PROCESSING APPARATUS AND THE INFORMATION PROCESSING APPARATUS

BACKGROUND OF THE INVENTION

1. Field of the Invention

The present invention generally relates to battery packs for information processing apparatuses and the information processing apparatuses, and more particularly, to a high capacity battery pack for a portable personal computer and the portable personal computer to which the pack is detachably connected.

2. Description of the Related Art

A portable personal computer has a battery pack connecting part by which a battery pack is connected to the portable personal computer, situated at a front end side face part of the body part and having a concave shape. A battery pack is connected to the battery pack connecting part, so that the battery pack is placed in an external form of the portable personal computer. A battery arranged in the battery pack is used as an electric power source to operate the portable personal computer.

As an option of the battery pack, a high capacity battery pack for a high capacity battery having a higher capacity than a normal battery can be used. Since the high capacity battery pack has a bigger size than a normal battery pack, an overhang part is formed in a state where the high capacity battery pack is connected to the battery pack connecting part of the body part. The overhang part overhangs from a body part side to a front side.

FIG. 1 is a perspective view of a related art a high capacity battery pack 10 and a battery pack connecting part 22 of a portable personal computer 20. FIG. 2 is a sectional view of the portable personal computer 20 to which the high capacity battery pack 10 shown in FIG. 1 is connected. Referring to FIGS. 1 and 2, the high capacity battery pack 10 is clamped to the battery pack connecting part 22 situated at a front end side face part of a body part 21 of the portable personal computer 20. The high capacity battery pack 10 has an upper surface 11 which is a plane. When the high capacity battery pack 10 is connected to the portable personal computer 20, a overhang part 12 overhangs from a front end side wall part 23 to a front side, namely a Y2 side. A liquid crystal display part 25 is capable of being opened and closed against the body part 21. An operator hangs and pulls up a front end part 26 of the liquid crystal display part 25 with a fingertip part 30 in order to open the liquid crystal display part 25 and use the portable personal computer 20.

However, the overhang part 12 of the high capacity battery pack 10, overhanging from the front end side wall 23 to the front side, namely the Y2 side, is a obstacle to hanging the front end part 26 of the liquid crystal display part 25 with the fingertip part 30 of the operator.

Hence, it is hard for the operator to operate to open the liquid crystal display part 25 of the related art portable personal computer 20, and a nail of the fingertip 30 of the operator may be harmed.

SUMMARY OF THE INVENTION

Accordingly, it is a general object of the present invention to provide a novel and useful battery pack for an information processing apparatus and the information processing apparatus, in which one or more of the problems described above are eliminated.

Another and more specific object of the present invention is to provide a battery pack for an information processing apparatus having a display part and the information processing apparatus, wherein the battery pack has a hollow part by which a fingertip part of an operator is accepted, so that the fingertip part is hang on an front end part of the display part of the information processing apparatus easily to open the display part.

The above objects of the present invention are achieved by a battery pack detachably connected to an information processing apparatus, wherein the information processing apparatus includes a body part and a display part supported by the body part and thereby the display part can be opened and closed against the body part, including a housing part having a hollow part in which a battery can be housed, wherein the hollow part is situated at a position which faces an end part of the display part when the display part is closed. The above objects of the present invention are also achieved by an information processing apparatus, including a body part in which an information processing part for processing information is arranged, a display part supported by the body part and thereby the display part can be opened and closed against the body part, and a battery pack which is detachably connected to the information processing apparatus and includes a housing part having a hollow part in which a battery can be housed, wherein the hollow part is situated at a position which faces an end part of the display part when the display part is closed.

According to the present invention described above, when an operator hangs and pulls up the front end part of the display part with a fingertip part of the operator in order to open the display part and use the information processing apparatus, it is not necessary to force to enter the fingertip part into a position between the front end part of the display part and the battery pack. That is, when the operator puts the fingertip at the front end part of the closed display part, the fingertip part is accepted by the hollow part. As a result, the front end part of the display part is easy to be hung by the fingertip part. Therefore, it is possible for the operator to open the display part smoothly and prevent a nail of the fingertip part from being harmed.

The hollow part may have a full length of the housing part in a width direction.

According to the present invention as described above, when the operator puts the fingertip on any position at the front end part of the closed display part in the width direction in order to attempt to open the display part, the fingertip part enters into the hollow part. That is, the front end part of the display part is easily hung with the fingertip part by reaching out the fingertip part to a convenient position to operate at the front end part of the display part, without seeking a position of the hollow part consciously. Hence, an operator can open the display part easily and accurately.

The housing part may include a first battery line housing part and a second battery line housing part in which batteries having column configurations can be respectively are housed, the first battery line housing part and the second battery line housing part are situated parallely in a width direction of the housing part, the housing part has a configuration fitting configurations of the batteries, and the hollow part is situated at a position between the first battery line housing part and the second battery line housing part.

According to the present invention as described above, it is possible to form the hollow part on the housing of the battery pack reasonably, without making the battery line housing parts of the housing in the battery pack narrow.

Other objects, features, and advantages of the present invention will be come more apparent from the following detailed description when read in conjunction with the accompanying drawings.

DETAILED DESCRIPTION OF THE PREFERRED EMBODIMENTS

A description will now be given, with reference to the drawings of FIGS. 3 through 7, of embodiments of the present invention.

Figure 1:
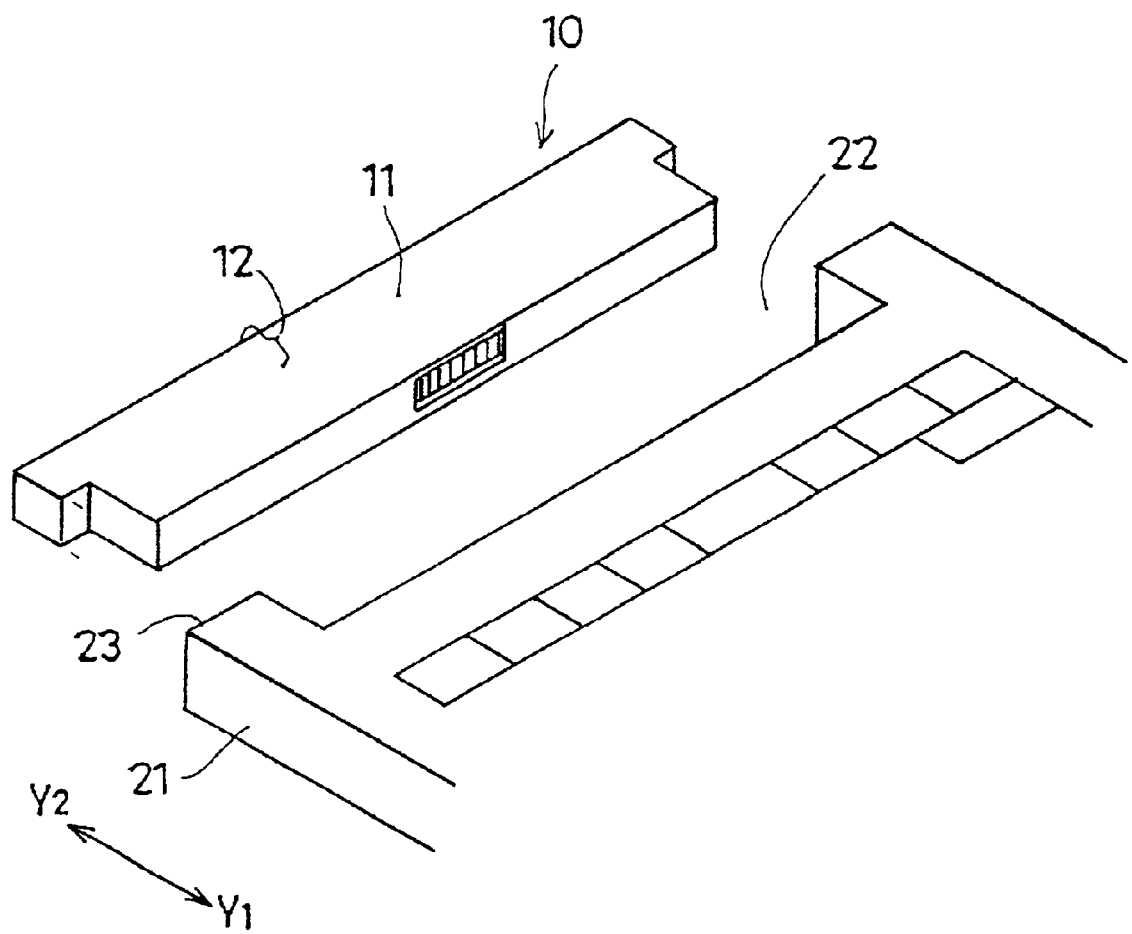
FIG. 1 is a perspective view of a related art high capacity battery pack and a battery pack connecting part of a portable personal computer.
Figure 2:
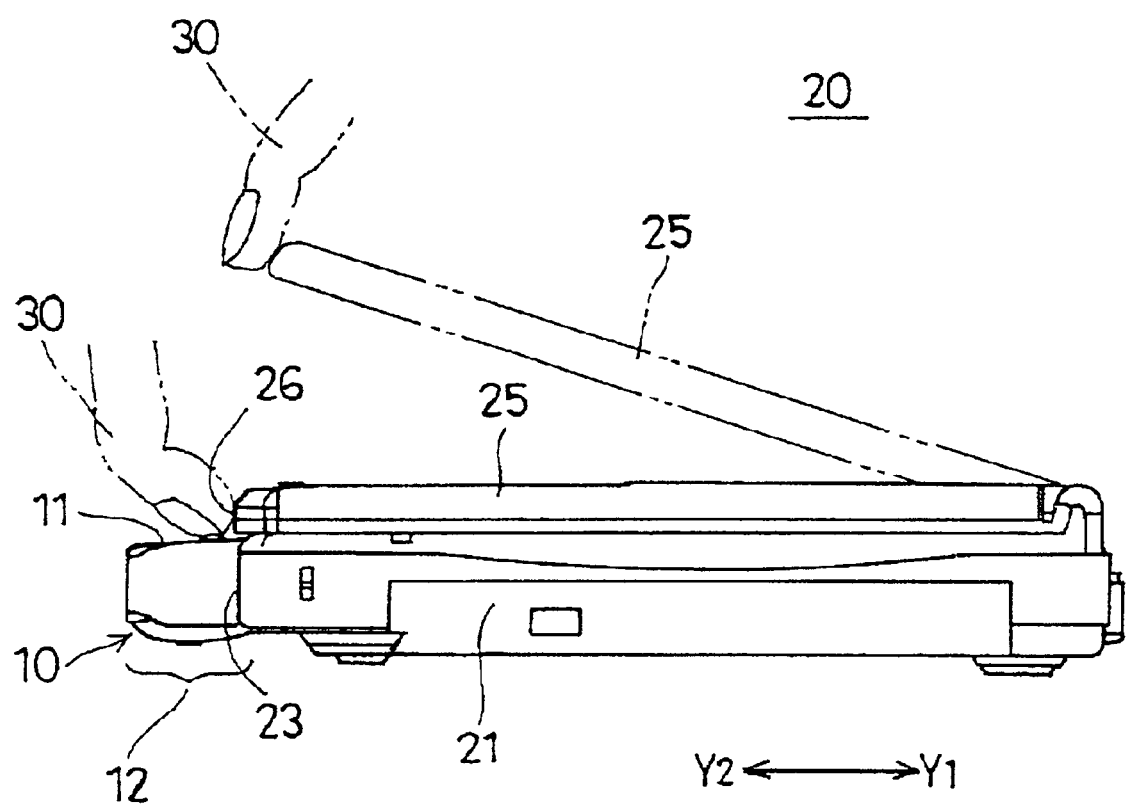
FIG. 2 is a sectional view of the portable personal computer to which the battery pack shown in FIG. 1 is connected.
Figure 3:
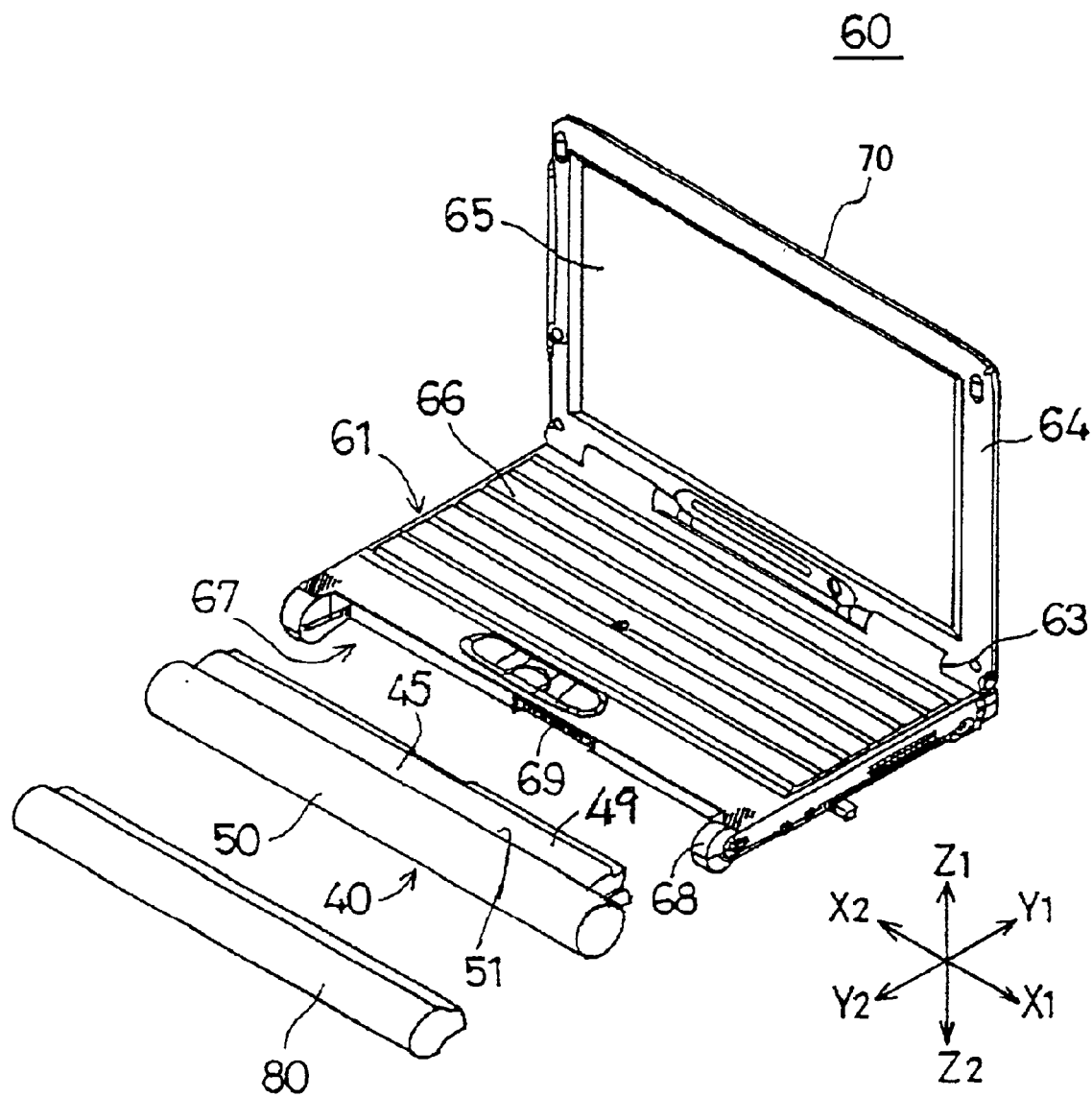
FIG. 3 is a perspective view of a correspondence of a high capacity battery pack and an information processing apparatus to which the high capacity battery pack is connected, according to an embodiment of the present invention.
Figure 4:
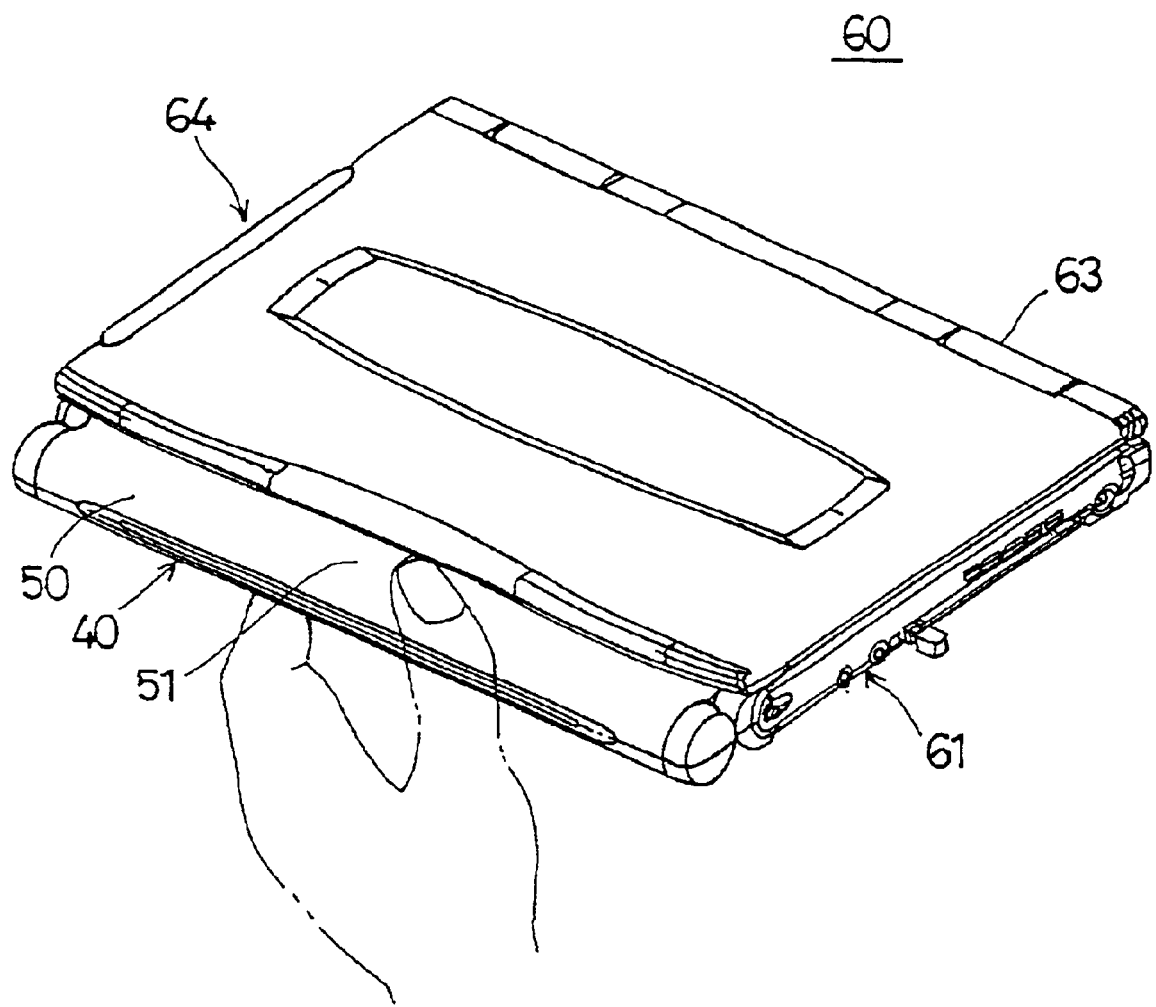
FIG. 4 is a perspective view for the information processing apparatus to which the high capacity battery pack is connected, according to an embodiment of the present invention.

FIG. 3 is a perspective view of a correspondence of a high capacity battery pack and an information processing apparatus to which the high capacity battery pack is connected, according to an embodiment of the present invention. FIG. 4 is a perspective view for the information processing apparatus to which the high capacity battery pack is connected, according to the embodiment of the present invention.

Referring to FIGS. 3 and 4, a high capacity battery pack 40 is connected a portable personal computer 60.

The portable personal computer 60 includes a body part 61 and a liquid crystal display part 64, as shown in FIGS. 3 and 4. The liquid crystal display part 64 is rotatably supported against the body part 61 by a supporting part 63 situated at a rear end part of the body part 61, so that the liquid crystal display part 64 can be opened and closed. When the liquid crystal display part 64 falls forward on the body part 61 and is closed, a liquid crystal display surface 65 cannot be seen by the operator. When the liquid crystal display part 64 is raised and opened, the liquid crystal display surface 65 is exposed to the operator. An information processing part such as an CPU not shown in FIGS. 3 and 4 is arranged inside of the body part 61. A key-board part 66 is arranged on an upper surface of the body part 61. A battery pack connecting part 67 for connecting a standard battery pack 80 or a high capacity battery pack 40 to the portable personal computer 60 is situated at a front end side face part of the body part 61. The battery pack connecting part 67 has a concave shape part against a front end side surface 68 of the body part 61. The concave shape part of the battery pack connecting part 67 has a same size as a size of the standard battery pack 80. The standard battery pack 80 is tightly connected to the battery pack connecting part 67 by a concave part 69.

A length from the supporting part 63 to a front end part 70 of the liquid crystal display part 64 is same as a length from the supporting part 63 to the front end side surface 68 of the body part 61.

Next, the high capacity battery pack 40 will be described with reference to FIGS. 5 and 6.

Figure 5:
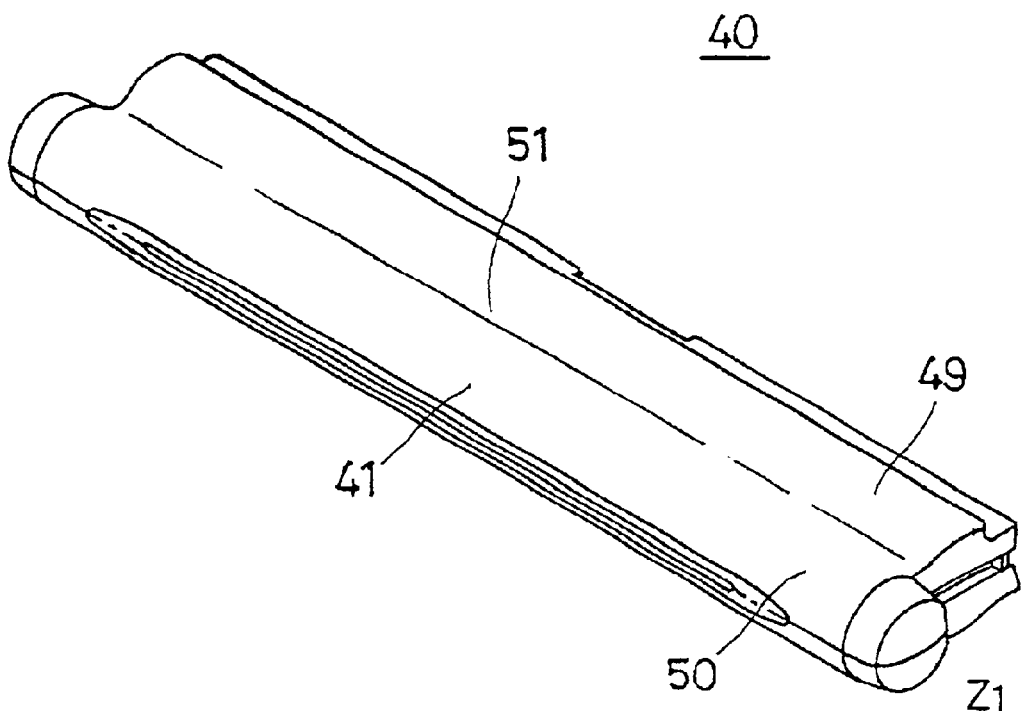
FIG. 5 is a perspective view of a high capacity battery pack according to the embodiment of the present invention.

FIG. 5 is a perspective view of the high capacity battery pack 40 according to the embodiment of the present invention. FIG. 6 is a sectional view of the high capacity battery pack 40 shown in FIG. 5.

Figure 6:
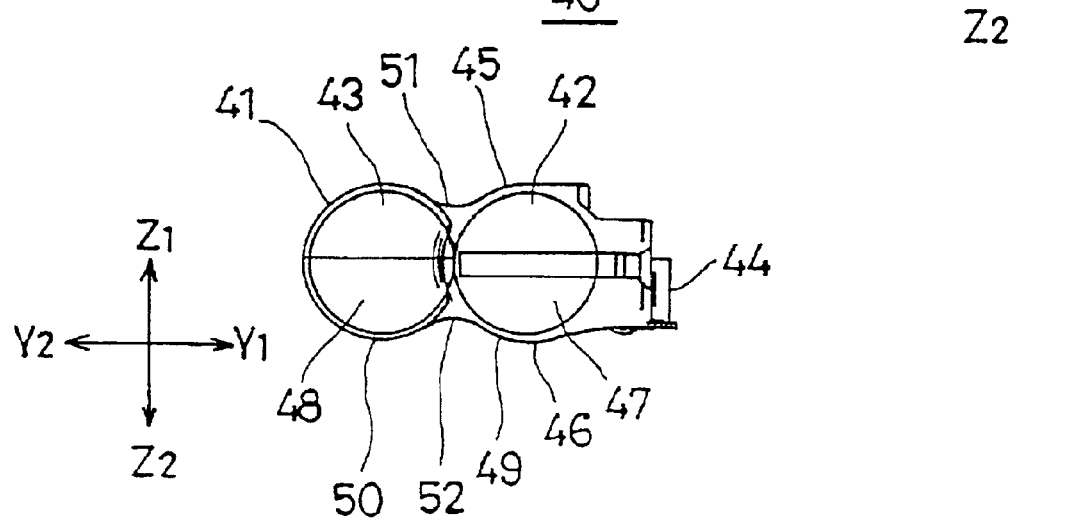
FIG. 6 is a sectional view of the high capacity battery pack shown in FIG. 5.

Referring to FIGS. 5 and 6, the high capacity battery pack 40 has a housing part 41. Batteries 42 and 43 having column shapes respectively are built in the housing 41 in a Y1-Y2 direction parallely. For example, three of the batteries 42 and three of the batteries 43 are built in the housing 41 parallely. A connector 44 is provided in the center of a surface of a Y1 side of the housing 41. The high capacity battery pack 40 also has an upper surface 45 and a lower surface 46.

A first battery line 47 is comprised of the plural battery 42 which form a line in an X1-X2 direction. A second battery line 48 is situated at a position adjoining a Y2 side of the first battery line 47. The second battery line 48 is comprised of the plural battery 43 which form a line in the X1-X2 direction. A first battery line housing part 49 where the first battery line 47 is housed and a second battery line housing part 50 where the second battery line 48 is housed are arranged in the housing 41. The first battery line housing part 49 adjoins the second battery line housing part 50 in the Y1-Y2 direction. The high capacity battery pack 40 has a bigger size than the standard battery pack 80 by the second battery line housing part 50. Since both ends of the X1-X2 direction of the second battery line housing part 50 overhangs from surfaces where the both ends of the first battery line housing part 49 are situated, the second battery line housing part 50 has a longer length in the X1-X2 direction than the first battery line housing part 49.

The housing 41 has a configuration fitting a configuration of the batteries. The first battery line housing part 49 has a configuration of a part of a cylinder. The second battery line housing part 50 has a substantially cylindrical configuration. The upper surface 45 of the housing 41 has a hollow part 51 having a full length of the housing 41 in the X1-X2 direction. The hollow part 51 is arranged between the first battery line housing part 49 and the second battery line housing part 50, on the upper surface 45 of the housing 41. The lower surface 46 of the housing has a hollow part 52 having a full length of the housing 41 in the X1-X2 direction. The hollow part 52 is arranged between the first battery line housing part 49 and the second battery line housing part 50, on the lower surface 46 of the housing 41.

As shown in FIG. 3 or FIG. 4, the high capacity battery pack 40 is detachably connected to the battery pack connecting part 67. The first battery line housing part 49 is connected to the battery pack connecting part 67 by the concave part 69. The second battery line housing part 50 overhangs from the front end side surface 68 of the body part 61 in the Y2 direction. The second battery line housing part 50 also overhangs from the front end part 70 of the liquid crystal display part 64 in the Y2 direction when the liquid crystal display part 64 is closed.

Figure 7:
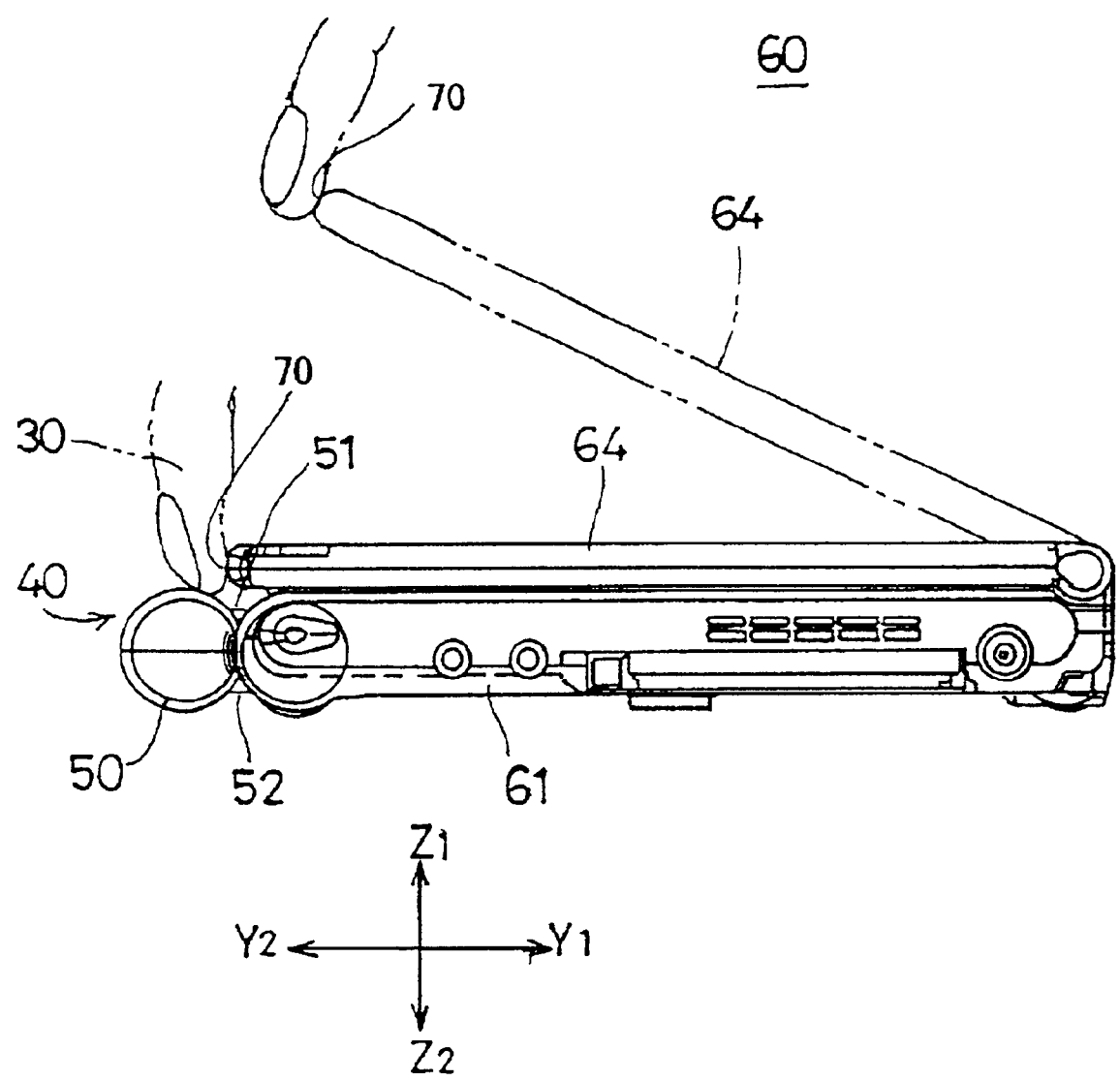
FIG. 7 is a view for explaining an operation to open a liquid crystal display part of the portable personal computer to which the high capacity battery pack 40 connected, according to an embodiment of the present invention.

FIG. 7 is a view for explaining an operation to open the liquid crystal display part 64 of the portable personal computer 60 to which the high capacity battery pack 40 is connected, according to the embodiment of the present invention.

Referring to FIG. 7, when the liquid crystal display part 64 is closed, the hollow part 51 faces the front end part 70 of the liquid crystal display part 64. Accordingly, when the operator hangs and pulls up the front end part 70 of the liquid crystal display part 64 with the fingertip part 30 in order to use the portable personal computer 60, the fingertip part 30 enters to the hollow part 51. As a result, the front end part 70 of the liquid crystal display part 64 is easy to be hung with the fingertip part 30, as shown in FIG. 7. Therefore, it is possible to open the liquid crystal display part 64 smoothly. Furthermore, it is not necessary to force to enter the fingertip part 30 into a position between liquid crystal display part 64 and the high capacity battery pack 40. Hence, it is possible to prevent a nail of the fingertip part 30 from being harmed.

If a similar hollow part with the hollow part 51 is situated on a part of the upper surface 45 of the housing 41 in the X1-X2 direction, it may be necessary for the operator to seek and put the fingertip part 30 the similar hollow part consciously. However, in this embodiment, the hollow part 51 has a full length of the housing 41 in the X1-X2 direction. Therefore, in this embodiment, it is not necessary for the operator to seek a position of the hollow part 51 consciously. The operator, in this embodiment, can find the hollow part 51 easily by reaching out the fingertip part 30 to a convenient position to operate the front end part 70 of the liquid crystal display part 64 in the X1-X2 direction. That is, in this embodiment, there is no limitation of a position where the fingertip part 30 is put. Hence, it is possible for the operator to operate to open the liquid crystal display part 64 smoothly.

In addition, the operator can smoothly operate to detach the high capacity battery pack 40 from the portable personal computer 60. That is, after the operator operates a lock off button not shown in FIG. 5 which is situated at the lower surface of the high capacity battery pack 40, the fingertip part 30 enters into the hollow parts 51 and 52 and the second battery line housing part 50 is grasped and pulled in the Y2 direction by hand of the operator, as shown in FIG. 5. As a result, the high capacity battery pack 40 can be detached from the portable personal computer 60 easily. Therefore, it may be avoided to fall down the high capacity battery pack 40 when the high capacity battery pack 40 is detached from the portable personal computer 60.

The present invention is not limited to these embodiments, but variations and modifications may be made without departing from the scope of the present invention. For instance, the battery pack of the present invention is not limited to the pack for the battery having a higher capacity than the standard battery pack. The present invention is able to be applied to a battery pack having a configuration in which an overhanging part overhangs from the body part to the front end side when the battery pack is connected to the battery pack connecting part of the body part.

In addition, the present invention is not limited to be applied to the battery pack of the above described embodiment where the plural battery having the column configurations are housed. A concrete structure of an inside of the battery pack is not limited to a structure described above.

This patent application is based on Japanese priority patent application No. 2001-283800 filed on Sep. 18, 2001, the entire contents of which are hereby incorporated by reference.

What is claimed is:

1. A battery pack detachably connectable to an information processing apparatus, wherein the information processing apparatus has a body part and a display part hinged to the body part at a rear end such that the display part can be opened and closed against the body part, the battery pack comprising;
   a housing, including at least one battery compartment to hold at least one battery, wherein an exterior of the housing comprises a hollow situated at a position under a front end portion of the display part when the display part is closed against the body part.

2. The battery pack as claimed in claim 1, wherein the battery compartment holds plural batteries.

3. The battery pack as claimed in claim 1, wherein the hollow runs a full length of the housing in a width direction parallel to the front edge of the display part.

4. The battery pack as claimed in claim 1, wherein the housing has an upper surface and a lower surface and a second hollow is situated on the lower surface.

5. The battery pack as claimed in claim 1, wherein the hollow comprises a curved configuration in cross section.

6. The battery pack as claimed in claim 2, wherein the housing includes a first battery line housing part and a second battery line housing part in which batteries having column configurations respectively are holdable, wherein the first battery line housing part and the second battery line housing part are situated parallely in a width direction of the housing, the housing has a configuration fitting configurations of the batteries, and the hollow is situated at a position between the first battery line housing part and the second battery line housing part.

7. The information processing apparatus, as claimed in claim 2, wherein the housing includes a first battery line housing part and a second battery line housing part in which batteries having column configurations respectively are holdable, wherein the first battery line housing part and the second battery line housing part are situated parallely in a width direction of the housing, the housing has a configuration fitting configurations of the batteries, and the hollow is situated at a position between the first battery line housing part and the second battery line housing part.

8. An information processing apparatus, comprising:
   a body part in which an information processing part for processing information is arranged;
   a display part hinged to the body part at a rear end such that the display part can be opened and closed against the body part; and
   a battery pack which is detachably connectable to the information processing apparatus and includes a housing, including at least one battery compartment to hold at least one battery, wherein an exterior of the housing comprises a hollow situated at a position under a front end portion of the display part when the display part is closed against the body part.

9. The information processing apparatus, as claimed in claim 8, wherein the battery compartment holds plural batteries.

10. The information processing apparatus, as claimed in claim 8, wherein the hollow runs a full length of the housing in a width direction parallel to the front edge of the display part.

11. The information processing apparatus, as claimed in claim 8, wherein the housing has an upper surface and a lower surface and a second hollow is situated on the lower surface.

12. The information processing apparatus, as claimed in claim 8, wherein the hollow comprises a curved configuration in cross section.

* * * * *

UNITED STATES PATENT AND TRADEMARK OFFICE
CERTIFICATE OF CORRECTION

PATENT NO.       : 6,795,305 B2                                         Page 1 of 1
APPLICATION NO.  : 10/087790
DATED            : September 21, 2004
INVENTOR(S)      : Tanaka et al.

It is certified that error appears in the above-identified patent and that said Letters Patent is hereby corrected as shown below:

In Claim 7;
on line 30 of column 6 change "claim 2" to be -- claim 9 --

Signed and Sealed this

Fourth Day of July, 2006

JON W. DUDAS
*Director of the United States Patent and Trademark Office*